(12) United States Patent
Bae et al.

(10) Patent No.: US 9,001,284 B2
(45) Date of Patent: Apr. 7, 2015

(54) LIQUID CRYSTAL DISPLAY AND MANUFACTURING METHOD THEREOF

(71) Applicant: Samsung Display Co., Ltd., Gyeonggi-do (KR)

(72) Inventors: Joo-Han Bae, Gyeonggi-do (KR); Dong Hyun Yu, Gyeonggi-do (KR); Hyung-Il Jeon, Icheon-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 143 days.

(21) Appl. No.: 13/889,426

(22) Filed: May 8, 2013

(65) Prior Publication Data

US 2014/0184970 A1    Jul. 3, 2014

(30) Foreign Application Priority Data

Dec. 27, 2012    (KR) .................... 10-2012-0155108

(51) Int. Cl.
*G02F 1/1343*    (2006.01)
*G02F 1/1333*    (2006.01)
*G02F 1/1362*    (2006.01)

(52) U.S. Cl.
CPC .... *G02F 1/134309* (2013.01); *G02F 1/133377* (2013.01); *G02F 1/136213* (2013.01); *G02F 2001/134354* (2013.01)

(58) Field of Classification Search
CPC ................. G02F 1/136213; G02F 1/136227; G02F 1/136286; G02F 2001/134345; G02F 1/1368; H01L 27/12

USPC ....................................................... 349/38, 39
See application file for complete search history.

(56) References Cited

U.S. PATENT DOCUMENTS

| 5,289,300 | A | 2/1994 | Yamazaki et al. |
| 6,469,761 | B1 * | 10/2002 | Drabik et al. .................. 349/122 |
| 8,089,592 | B2 | 1/2012 | Kwon et al. |
| 2006/0115231 | A1 * | 6/2006 | Ishida ........................... 385/147 |
| 2006/0146267 | A1 | 7/2006 | Choi et al. |

FOREIGN PATENT DOCUMENTS

| JP | 2000-330130 | 11/2000 |
| JP | 2002-258323 | 9/2002 |
| KR | 100405126 | 10/2003 |
| KR | 1020120026880 | 3/2012 |
| KR | 1020140025739 | 3/2014 |

* cited by examiner

*Primary Examiner* — Mike Qi
(74) *Attorney, Agent, or Firm* — F. Chau & Associates, LLC

(57) ABSTRACT

A liquid crystal display includes a gate line formed on an insulation substrate. A data line, insulated from the gate line, crosses the gate line. A first pixel is connected to the gate line and the data line. The pixel includes a thin film transistor having a control terminal connected to the gate line and an input terminal connected to the data line. A first liquid crystal capacitor has one end connected to an output terminal of the thin film transistor. A second liquid crystal capacitor has one end connected to the other end of the first liquid crystal capacitor. The first liquid crystal capacitor includes a first liquid crystal layer formed in a first microcavity and the second liquid crystal capacitor includes a second liquid crystal layer formed in a second microcavity.

20 Claims, 14 Drawing Sheets

(A)

(B)

LIQUID CRYSTAL DISPLAY AND MANUFACTURING METHOD THEREOF

CROSS-REFERENCE TO RELATED APPLICATION

This application claims priority under 35 U.S.C §119 to Korean Patent Application No. 10-2012-0155108, filed on Dec. 27, 2012, in the Korean Intellectual Property Office, the disclosure of which is incorporated by reference herein in its entirety.

TECHNICAL FIELD

The present invention relates to a liquid crystal display and a manufacturing method thereof, and more particularly, to a liquid crystal display including a liquid crystal layer present in a microcavity, and a manufacturing method thereof.

DISCUSSION OF RELATED ART

Liquid crystal displays are widely used as flat panel displays. Recently, it has been proposed that liquid crystal molecules are disposed in an array of microcavities.

SUMMARY

According to an exemplary embodiment of the present invention, a liquid crystal display includes a gate line formed on an insulation substrate. A data line, insulated from the gate line, crosses the gate line. A first pixel is connected to the gate line and the data line. The pixel includes a thin film transistor having a control terminal connected to the gate line and an input terminal connected to the data line. A first liquid crystal capacitor has one end connected to an output terminal of the thin film transistor. A second liquid crystal capacitor has one end connected to the other end of the first liquid crystal capacitor. The first liquid crystal capacitor includes a first liquid crystal layer formed in a first microcavity and the second liquid crystal capacitor includes a second liquid crystal layer formed in a second microcavity.

According to an exemplary embodiment of the present invention, a liquid crystal display includes a gate line formed on an insulation substrate. A data line, insulated from the gate line, crosses the gate line. A thin film transistor includes a control terminal connected to the gate line and an input terminal connected to the data line. A pixel electrode has a first area and is connected to an output terminal of the thin film transistor. A common electrode has a second area and receives a common voltage. A floating electrode includes a first floating electrode of which a portion faces the pixel electrode and a second floating electrode of which a portion faces the common electrode.

According to an exemplary embodiment of the present invention, a pixel electrode having a first area and a second floating electrode are formed on an insulation substrate. A first sacrificial layer having a first thickness is formed on the pixel electrode. A second sacrificial layer having a second thickness is formed on the second floating electrode. A first floating electrode is connected to the second floating electrode on the first sacrificial layer. A common electrode having a second area is formed on the second sacrificial layer. A roof layer is formed on the first floating electrode and the common electrode. A liquid crystal injection hole is formed to expose a side surface of the first and the second sacrificial layer. A first microcavity and a second microcavity are formed by removing the first sacrificial layer and the second sacrificial layer through the liquid crystal injection hole. Liquid crystal molecules are injected in the first microcavity and the second microcavity through the liquid crystal injection hole.

BRIEF DESCRIPTION OF THE DRAWINGS

These and other features of the inventive concept will become more apparent by describing in detail exemplary embodiments thereof with reference to the accompanying drawings of which.

DETAILED DESCRIPTION OF THE EMBODIMENTS

Figure 1:
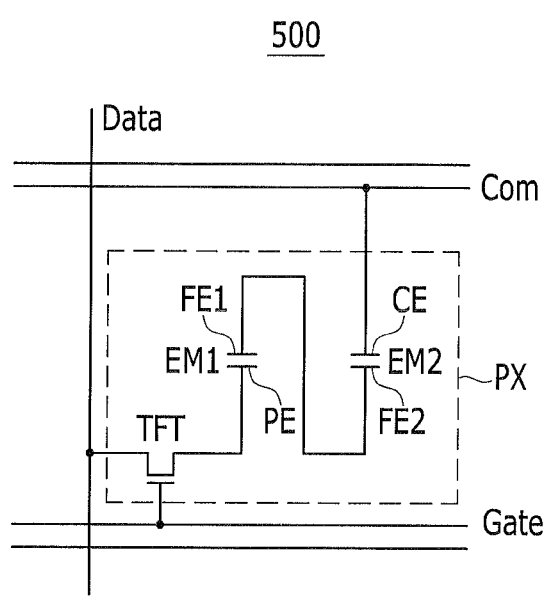
FIG. 1 is a pixel equivalent circuit diagram of a liquid crystal display according to an exemplary embodiment of the present invention.

Exemplary embodiments of the inventive concept will be described below in more detail with reference to the accompanying drawings. However, the inventive concept may be embodied in different forms and should not be construed as limited to the embodiments set forth herein. Rather, these exemplary embodiments are provided so that this disclosure will be thorough and complete and will fully convey the inventive concept to those skilled in the art. In the drawings, the thickness of layers and regions may be exaggerated for clarity. Like reference numerals may refer to the like elements throughout the specification and drawings. It will be understood that when an element such as a layer, film, region, or substrate is referred to as being "on" another element, it may be directly on the other element or intervening elements may also be present. In contrast, when an element is referred to as being "directly on" another element, there are no intervening elements present.

Hereinafter, a liquid crystal display according to an exemplary embodiment of the present invention will be described in detail with reference to FIG. 1.

FIG. 1 is a pixel equivalent circuit diagram of a liquid crystal display according to an exemplary embodiment of the present invention.

A liquid crystal display 500 includes a pixel PX. The pixel PX includes two serially connected liquid crystal capacitors EM1 and EM2, and a switching element TFT connected to an input terminal of the first liquid crystal capacitor EM1. The switching element TFT may include a thin film transistor. The liquid crystal capacitors EM1 and EM2 may, respectively, include a liquid crystal layer (not shown) positioned inside a microcavity (not shown). The liquid crystal display 500 may further include a lower insulation substrate, but need not include an upper insulation substrate.

The liquid crystal capacitors EM1 and EM2 include a pair of electrodes. The liquid crystal layer may be positioned in the microcavity (not shown). For example, the first liquid crystal capacitor EM1 includes a pixel electrode PE and a first floating electrode FE1. A first liquid crystal layer (not shown) may be positioned in a first microcavity (not shown). The second liquid crystal capacitor EM2 includes a second floating electrode FE2 and a common electrode CE. The second floating electrode FE2 is connected to the first floating electrode FE1. The common electrode CE is connected to a common voltage applying line Com. A second liquid crystal layer (not shown) may be positioned in a second microcavity (not shown). Here, the pair of electrodes may define the microcavity, and thus the liquid crystal layer may be positioned in the microcavity defined by the pair of electrode, i.e., between the pair of the electrodes.

The switching element TFT includes a control terminal, an input terminal, and an output terminal. The control terminal is connected to a gate line Gate. The input terminal is connected to a data line Data. The output terminal is connected to the pixel electrode PE of the first liquid crystal capacitor EM1.

The common electrode CE of the second liquid crystal capacitor EM2 is connected to the common voltage applying line Com. A common voltage applied to the common voltage applying line may have 0 V or a predetermined voltage value.

In the aforementioned pixel structure, the first floating electrode FE1 and the second floating electrode FE2 may have substantially the same voltage value. The voltage value may be one between voltages applied to the pixel electrode PE and the common electrode CE. The voltages values of the first floating electrode and the second floating electrode may have different voltage values according to capacitance of the liquid crystal capacitors EM1 and EM2. For example, when capacitance of the first liquid crystal capacitor EM1 is substantially the same as capacitance of the second liquid crystal capacitor EM2, the voltage value of the first floating electrode FE1 and the second floating electrode FE2 has an intermediate value of the voltage value of the pixel electrode PE and the voltage value of the common electrode CE.

The aforementioned structure will be further described below.

One end of the first liquid crystal capacitor is connected to an output terminal of the thin film transistor, and the other end is connected to an end of the second liquid crystal capacitor. The other end of the second liquid crystal capacitor receives a common voltage.

According to an exemplary embodiment, the equivalent circuit diagram of FIG. 1 may be implemented in various pixel arrangements. An arrangement of a pixel and a cross-section of the pixel according to an exemplary embodiment will be described below with reference to FIGS. 2 and 3.

Figure 2:
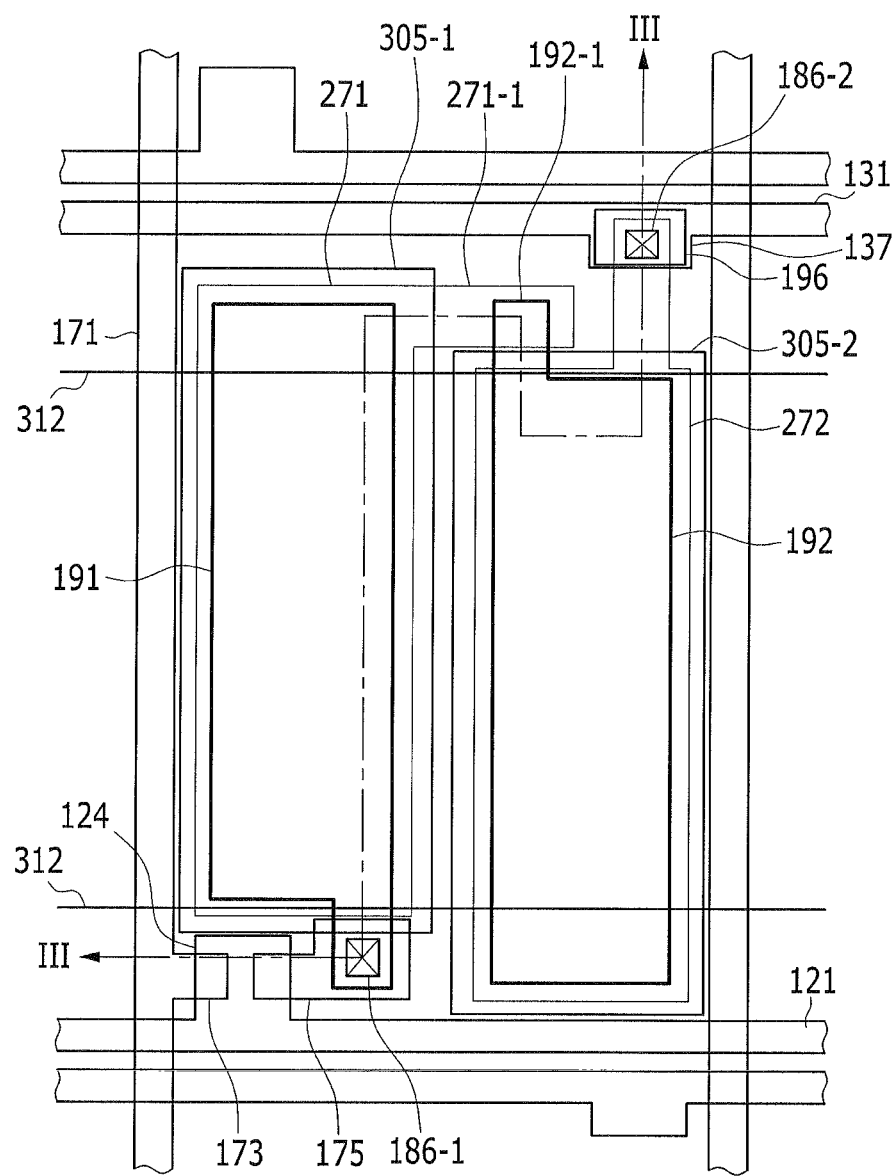
FIG. 2 is a layout view of a liquid crystal display according to an exemplary embodiment of the present invention.
Figure 3:
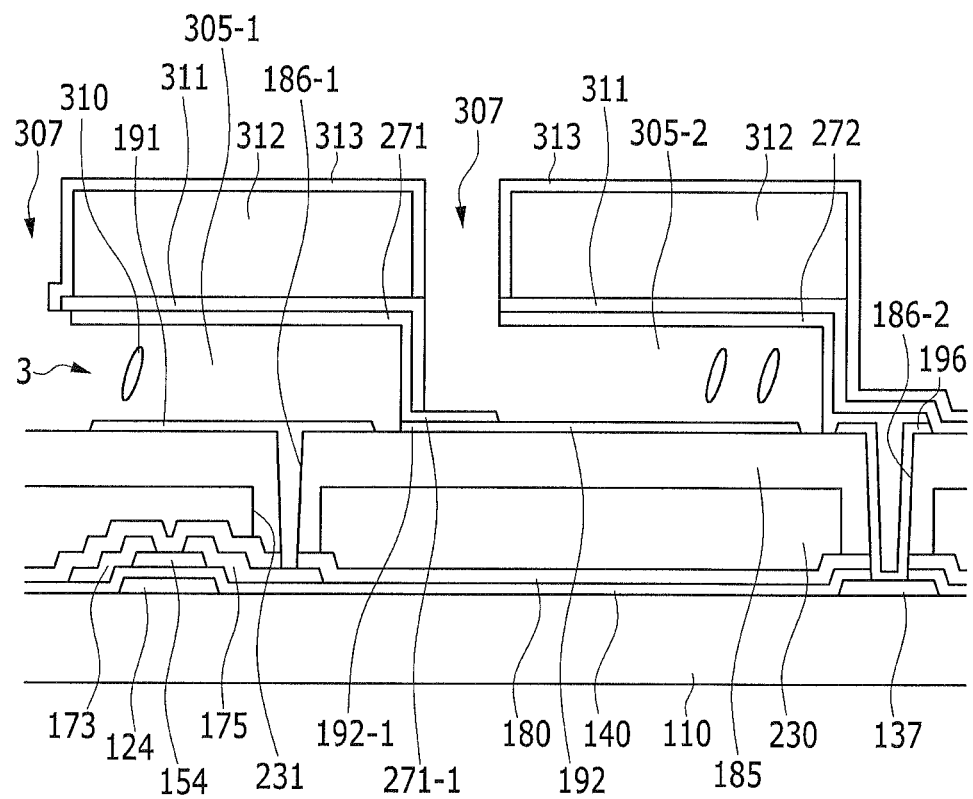
FIG. 3 is a cross-sectional view taken along line of FIG. 2.

FIG. 2 is a layout view of the liquid crystal display according to an exemplary embodiment of the present invention, and FIG. 3 is a cross-sectional view taken along line of FIG. 2.

A gate line 121 and a common voltage applying line 131 are formed on an insulation substrate 110. The insulation substrate may include transparent glass or plastic. The gate line 121 and the common voltage applying line 131 are disposed in parallel to each other and are spaced apart from each other at a predetermined interval. The gate line 121 and the common voltage applying line 131 are extended in a first direction. The gate line 121 includes a gate electrode 124 protruding upwardly or in a second direction crossing the first direction, and the common voltage applying line 131 includes a protrusion 137 protruding downwardly or in opposite to the second direction.

A gate insulating layer 140 is formed on the gate electrode 124 and the protrusion 137 of the common voltage applying line 131. A semiconductor layer 154 having a channel part of the thin film transistor is formed on the gate insulating layer 140.

The source electrode 173 and the drain electrode 175 are formed on the semiconductor layer 154 and the gate insulating layer 140. The data line 171 is extended in the second direction crossing the first direction in which the gate line 121 is extended.

A plurality of ohmic contacts (not shown) may be formed between the semiconductor layer 154 and a source electrode 173 and may be further formed between the semiconductor layer 154 and a drain electrode 175.

The thin film transistor TFT includes the gate electrode 124, the source electrode 173, the drain electrode 175, and the semiconductor layer 154. The semiconductor layer 154 includes a channel (not shown) of the thin film transistor TFT. For example, the channel may be formed in an upper portion of the semiconductor layer 154 between the source electrode 173 and the drain electrode 175.

A first passivation layer 180 is formed on the source electrode 173, the drain electrode 175 and an exposed portion of the semiconductor layer 154. The exposed portion of the semiconductor layer 154 is defined by the source and the drain electrodes 173 and 175. The first passivation layer 180 may include an inorganic insulating material and/or an organic insulating material. For example, the inorganic insulating material may include silicon nitride ($SiN_x$) and/or silicon oxide ($SiO_x$).

A Color filter 230 is formed on the first passivation layer 180. The color filter 230 may display a primary color of three primary colors including red, green, and blue. However, the color filter 230 is not limited thereto, but and the color filter 230 may display one of colors including cyan, magenta, yellow, and white.

A light blocking member (not shown) may be formed on the color filter 230. The light blocking member (not shown) may include a black matrix. The light blocking member may be formed on a region (hereinafter, referred to as a "transistor region") in which the gate line 121, the common voltage applying line 131, and the thin film transistor are formed. The light blocking member may be further formed on a region in which the data line 171 is formed. The light blocking member may have a lattice structure including an opening through which light is transmitted to display an image. Although not shown in FIGS. 2 and 3, the color filter 230 may be disposed in the opening of the light blocking member. Further, the light blocking member may include a material preventing light from being transmitted.

A second passivation layer 185 for covering the color filter 230 and the light blocking member (not shown) is formed on the color filter 230 and the light blocking member (not shown). The second passivation layer 185 may include an inorganic insulating layer, such as silicon nitride ($SiN_x$) and/or silicon oxide ($SiO_x$), and/or an organic insulating layer. The second passivation layer 185 may serve to provide a planarized surface for a subsequent process.

A first contact hole 186-1 penetrates the first and the second passivation layers 180 and 185 to expose a portion of the drain electrode 175. A second contact hole 186-2 penetrates the first and the second passivation layer 180 and 185 and the gate insulating layer 140 to expose a portion of the protrusion 137 of the common voltage applying line. The second insulating layer 185 is formed in an opening 231 of the color filter 230. The opening 231 of the color filter 230 partially exposes an upper surface of the first insulating layer 180.

In an exemplary embodiment, the contact holes 186-1 and 186-2 may be formed in the color filter 230 when the color filter 230 may cover the second insulating layer 180 without forming the opening 231 in the color filter 230.

The pixel electrode 191 and the second floating electrode 192 are formed on the second passivation layer 185. The pixel electrode 191 and the second floating electrode 192 may include a transparent conductive material such as ITO and/or IZO. The pixel electrode 191 and the second floating electrode 192 are positioned within a pixel region. The pixel region is defined by the gate line 121, the data line 171, and the common voltage applying line 131. The pixel electrode 191 and the second floating electrode 192 are separately positioned within the pixel region.

As shown in FIG. 2, the pixel electrode 191 and the second floating electrode 192 are horizontally adjacent to each other. Further, an area of the pixel electrode 191 may be substantially equal to an area of the second floating electrode 192. According to an exemplary embodiment, the pixel electrode 191 and the second floating electrode 192 may have different areas.

The pixel electrode 191 includes a protrusion which is extended towards the first contact hole 186-1. The protrusion is physically and electrically connected to the drain electrode 175 through the first contact hole 186-1. The pixel electrode 191 receives a data voltage from the drain electrode 175 through the protrusion.

The second floating electrode 192 has an exposed portion 192-1 protruding upwardly.

Microcavities 305-1 and 305-2 are formed on the second passivation layer 185 and are defined by the electrodes 191, 192, 271 and 272. For example, the first microcavity 305-1 is a region defined by the pixel electrode 191 and the first floating electrode 271. The second microcavity 305-2 is a region defined by the second floating electrode 192 and the common electrode 272.

Liquid crystal molecules 310 are disposed in the first microcavity 305-1 and the second microcavity 305-2 to form a liquid crystal layer 3. The liquid crystal layer 3 of the first microcavity 305-1 is referred to as a first liquid crystal layer, and the liquid crystal layer 3 of the second microcavity 305-2 is referred to as a second liquid crystal layer.

An alignment layer (not shown) may be formed on the electrodes 191, 192, 271 and 272 to arrange the liquid crystal molecules 310 disposed in the microcavities 305-1 and 305-2. The alignment layer may include polyamic acid, polysiloxane, and/or polyimide. The present invention is not limited thereto, but may include other materials.

The liquid crystal layer 3 may be formed in the microcavities 305-1 and 305-2 by capillary force. The alignment layer (not shown) may be formed by capillary force. In an exemplary embodiment of the present invention, the two microcavities are formed in the pixel region. The microcavity may be relatively small in size, and the liquid crystal molecules 310 may be more rapidly absorbed on a surface of the microcavity by capillary force when the liquid crystal molecules are injected in forming the liquid crystal layer 3.

A height of the liquid crystal layer 3 corresponds to a height of the microcavities 305-1 and 305-2, i.e., a vertical distance between a pair of electrodes facing each other. For example, the height of the first microcavity is substantially equal to a distance between the pixel electrode 191 and the first floating electrode 191 facing each other. The height of the second microcavity is substantially equal to a distance between the common electrode 272 and the second floating electrode 192 facing each other. The microcavities 305-1 and 305-2 have several micrometers or several nanometers in height. The liquid crystal layer 3 disposed in the microcavities 305-1 and 305-2 is also referred to as a nano crystal.

The microcavities 305-1 and 305-2 have a side surface, an upper surface, and a lower surface. The side surface has a vertical one. The present invention is not limited thereto, but the side surface may be tapered or inversely tapered. The upper surface and the lower surface are horizontal. For example, as to the first microcavity 305-1, the side and the upper surfaces are defined by the first floating electrode 271. The lower surface is defined by the pixel electrode 191. As to the second microcavity 305-2, the side and the upper surfaces are defined by the common electrode 272. The lower surface is defined by the second floating electrode 192.

The first floating electrode 271 is positioned on the first liquid crystal layer of the first microcavity 305-1. The common electrode 272 is positioned on the second liquid crystal layer of the second microcavity 305-2.

The first floating electrode 271 and the common electrode 272 include a transparent conductive material, such as ITO and/or IZO.

The exposed portion 192-1 and a connection portion 271-1 of the first floating electrode 271 are not covered by the liquid crystal layer 3.

The first floating electrode 271 has the connection portion 271-1 extended along the side surface of the first microcavity 305-1. The connection portion 271-1 is electrically connected to the exposed portion 192-1 of the second floating electrode 192. As a result, the first floating electrode 271 and the second floating electrode 192 are electrically connected to each other.

The common electrode 272 protrudes toward the second contact hole 186-2, and has a protrusion electrically connected to the protrusion 137 of the common voltage applying line 131 through the second contact hole 186-2. The common electrode 272 receives the common voltage through the protrusion.

A lower insulating layer 311 for covering the first floating electrode 271, the common electrode 272, the second passivation layer 185, and the liquid crystal layer 3 is positioned on the first floating electrode 271, the common electrode 272, and the second passivation layer 185, and in the side surface of the liquid crystal layer 3. The lower insulating layer 311 may include an inorganic insulating material, such as silicon nitride (SiNx).

The lower insulating layer 311 includes a liquid crystal injection hole 307 through which the liquid crystal molecules 310 are injected in the microcavities 305-1 and 305-2. The liquid crystal injection hole 307 is connected to the microcavities 305-1 and 305-2. Further, the liquid crystal injection hole 307 may be used when a sacrificial layer (not shown) is removed to form the microcavities 305-1 and 305-2. This will be described in detail when a manufacturing method is described.

A roof layer 312 is formed on the lower insulating layer 311. The roof layer 312 serves to support the microcavity 305-1 between the pixel electrode 191 and the first floating electrode 271. The roof layer 312 further serves to support the microcavity 305-2 between the second floating electrode 192 and the common electrode 272. In an exemplary embodiment, the roof layer 312 may include an organic insulating material. The roof layer 312 includes the liquid crystal injection hole 307 to inject the liquid crystal molecules 310 in the microcavities 305-1 and 305-2.

The upper insulating layer 313 is formed on the roof layer 312. The upper insulating layer 313 may include an inorganic insulating material, such as silicon nitride (SiNx). The roof layer 312 and the upper insulating layer 313 are patterned together with the lower insulating layer 311 to form the liquid crystal injection hole 307.

According to an exemplary embodiment, the lower insulating layer 311 and the upper insulating layer 313 may be omitted.

A capping layer (not shown) is formed on the upper insulating layer 313 to prevent the liquid crystal molecules 310 from being leaked to the outside through the liquid crystal injection hole 307.

A polarization plate (not shown) is positioned under the insulation substrate 110 and above the upper insulating layer 313 (or above the capping layer). The polarization plate may include a polarization element for generating polarized light and a tri-acetyl-cellulose (TAC) layer for securing durability. In an exemplary embodiment, transmission axes of an upper polarization plate and a lower polarization plate may be vertical or parallel.

In FIGS. 2 and 3, the first liquid crystal capacitor EM1 includes the pixel electrode 191, the first floating electrode 271, and the first liquid crystal layer disposed in the first microcavity 305-1. Further, the second liquid crystal capacitor EM2 includes the second floating electrode 192, the common electrode 272, and the second liquid crystal layer disposed in the second microcavity 305-2. The first floating electrode 271 and the second floating electrode 192 are connected to each other, and the first liquid crystal capacitor EM1 and the second liquid crystal capacitor EM2 are serially connected to each other.

The liquid crystal molecules 310 of the first liquid crystal layer are controlled by an electric field generated by the pixel electrode 191 and the first floating electrode 271, and the liquid crystal molecules 310 of the second liquid crystal layer are controlled by an electric field generated by the second floating electrode 192 and the common electrode 272.

In the liquid crystal layer 3 positioned inside the microcavities 305-1 and 305-2, the liquid crystal molecules 310 are initially aligned by the alignment layer, and an alignment direction is changed according to the applied electric field.

The first liquid crystal capacitor EM1 and the second liquid crystal capacitor EM2 may have the same capacitance value. In such case, the voltage applied to the first and second floating electrodes 271 and 192 has an intermediate value of the voltage of the pixel electrode 191 and the voltage of the common electrode 272.

According to an exemplary embodiment, a pixel includes the two serially connected liquid crystal capacitors EM1 and EM2 as described above, and thus when one microcavity is collapsed due to external pressure, it is possible to display an image through the other liquid crystal capacitor.

This will be described with reference to FIG. 4.

Figure 4:
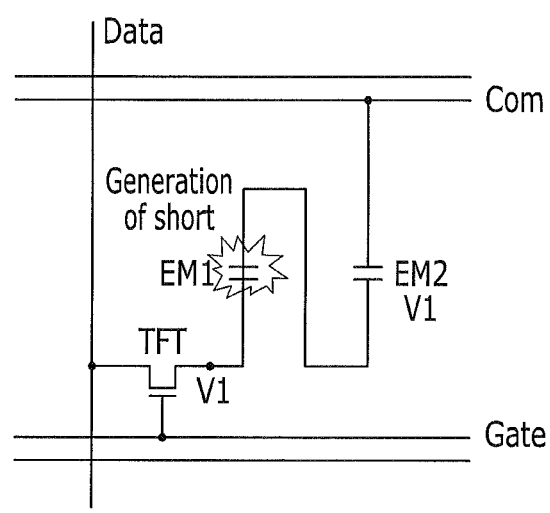
FIG. 4 is an equivalent circuit diagram to represent a short-circuit which occurs in a liquid crystal display manufactured according to an exemplary embodiment of the present invention.
Figure 5:
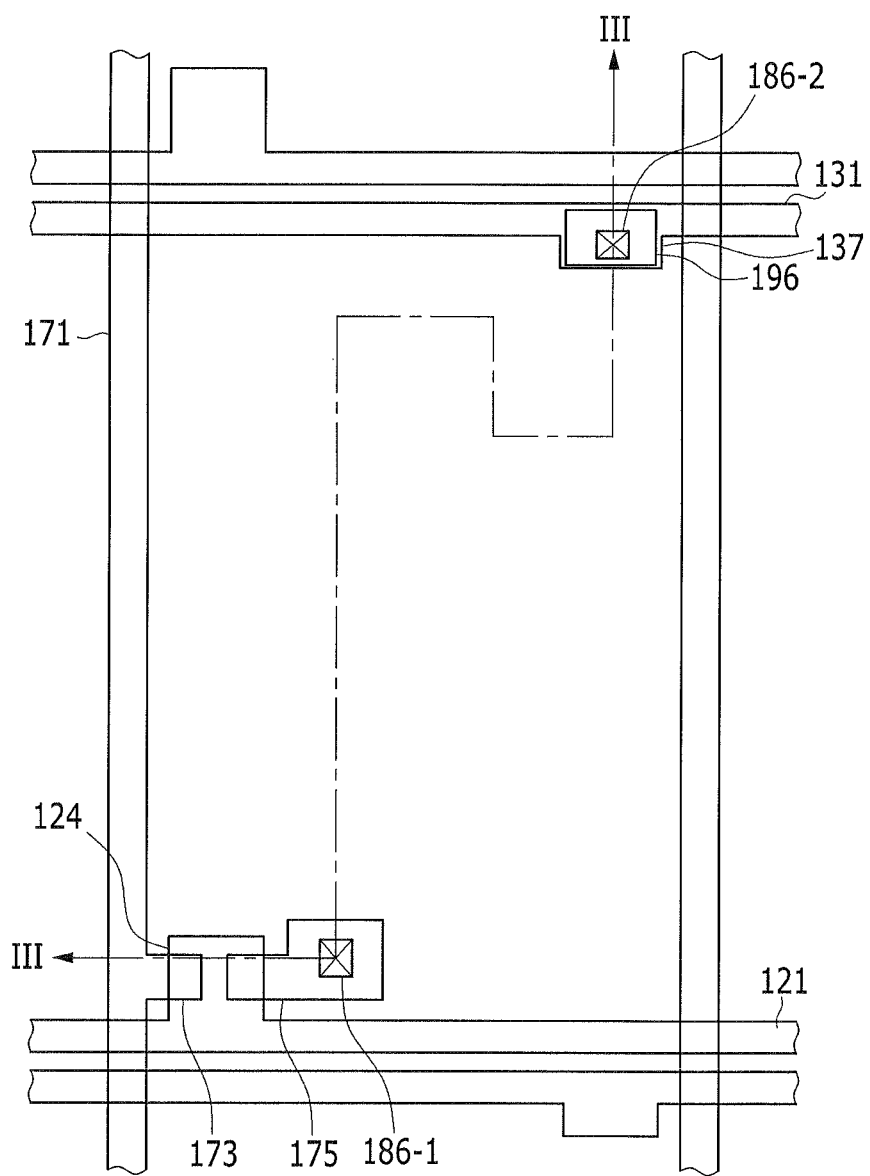
FIGS. 5 to 10 are views sequentially illustrating a method of manufacturing a liquid crystal display according to an exemplary embodiment of the present invention.

FIG. 4 is an equivalent circuit diagram to represent a short-circuit which occurs in a liquid crystal display manufactured according to an exemplary embodiment of the present invention.

FIG. 4 illustrates a circuit diagram to represent a case in which the first liquid crystal capacitor EM1 is short-circuited due to collapse of the microcavity 305-1. When the microcavity 305-1 is collapsed, the first floating electrode 271 positioned in the upper surface of the microcavity 305-1 is collapsed downwardly, and the first floating electrode 271 is electrically shorted with the pixel electrode 191. In this case, as illustrated in FIG. 4, the voltage of the pixel electrode 191 is directly connected to the first floating electrode 271, and thus the voltage is transmitted to the second floating electrode 192. As a result, even when the first liquid crystal capacitor EM1 does not function, the second liquid crystal capacitor EM2 still works. For example, an electric field is generated according to a data voltage in the second liquid crystal capacitor EM2, and thus transmittance of light is set to display an image.

According to an exemplary embodiment, the liquid crystal layer is disposed in the microcavity in the liquid crystal display, and even when a microcavity is collapsed, it is possible to display an image through the other serially connected liquid crystal capacitor.

Further, in FIGS. 2 and 3, a floating electrode is divided into the first floating electrode 271 and the second floating electrode 192, but the present invention is not limited to two floating electrodes, but the floating electrode may include a single floating electrode or three or more floating electrodes. When the floating electrode includes a single floating electrode, the first liquid crystal layer and the second liquid crystal layer may be positioned above and/or under the one floating electrode.

The circuit configuration of FIG. 1 is not limited to the exemplary embodiment of FIGS. 2 and 3, but the circuit of FIG. 1 may be configured in various ways.

Hereinafter, a method of manufacturing the liquid crystal display according to an exemplary embodiment of the present invention will be described with reference to FIGS. 5 to 10.

FIGS. 5 to 10 are views sequentially illustrating a method of manufacturing the liquid crystal display according to an exemplary embodiment of the present invention.

A gate line 121 and a common voltage applying line 131 are formed on an insulation substrate 110 using a same mask. The insulation substrate 110 may include transparent glass and/or plastic. The gate line 121 and the common voltage applying line 131 may include substantially the same material. Further, the gate line 121 includes a gate electrode 124, and the common voltage applying line 131 includes a protrusion 137. A gate voltage is applied to the gate line 121, and a common voltage is applied to the common voltage applying line 131. The gate line 121 and the common voltage applying line 131 are parallel to each other at a predetermined interval, and are extended in a first direction.

A gate insulating layer 140 is formed on the gate electrode 124 and the protrusion 137 of the common voltage applying line 131.

Then, a semiconductor layer 154 is formed on the gate insulating layer 140, and a source electrode 173 and a drain electrode 175 are formed on the semiconductor layer 154. A data line 171 including the source electrode 173 is extended in a second direction crossing the first direction.

According to an exemplary embodiment, the semiconductor layer 154, the source electrode 173, and the drain electrode 175 may be patterned together by using a same mask. For example, the semiconductor layer 154 and a material for forming the source electrode 173, and the drain electrode 175 are sequentially stacked. Then, the source electrode 173 and the drain electrode 175 are patterned by removing a portion of the material to expose an upper surface of the semiconductor layer 154. The removed portion is positioned at the channel part of a thin film transistor.

A ohmic contact (not shown) may be formed between the semiconductor layer 154 and the source electrode 173. A ohmic contact (not shown) may be further formed between the semiconductor layer 154 and the drain electrode 175.

A first passivation layer 180 is formed on the data conductors 171, 173, and 175, and the exposed portion of the semiconductor layer 154. The first passivation layer 180 may include an inorganic insulating material, such as silicon nitride (SiNx) and silicon oxide (SiOx), and/or an organic insulating material.

Then, a color filter 230 is formed on the first passivation layer 180.

Figure 6:
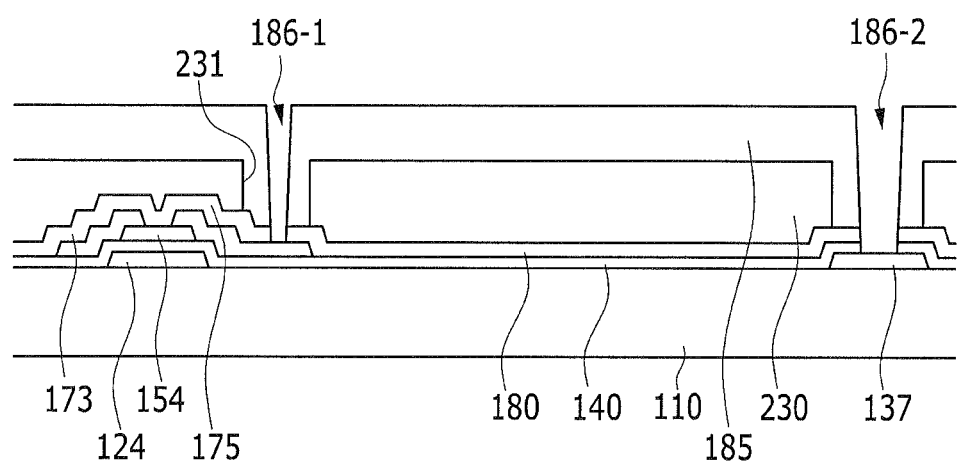

As illustrated in FIG. 6, the color filter 230 is partially removed to form an opening 231 positioned at a position at which contact holes 186-1 and 186-2 are to be formed in a subsequent process.

A light blocking member (not shown) may include a material for preventing light from being transmitted on the color filter 230. The light blocking member is formed in a lattice structure having openings corresponding to regions for displaying an image. The color filter 230 may be formed in the openings. The light blocking member may have a portion formed in a horizontal direction along the gate line 121, the common voltage applying line 131, and a transistor formed region in which the thin film transistor is formed, and a portion formed in a vertical direction on a region in which the data line 171 is formed. The light blocking member may be positioned under the color filter 230, and may be positioned in microcavities.

Then, the second passivation layer 185 is formed on the color filter 230 and the light blocking member, filling the opening 231 of the color filter 230. The second passivation layer 185 may include the organic insulating material.

Then, the first contact hole 186-1 and the second contact hole 186-2 are formed to partially expose the drain electrode 175 and the protrusion 137 of the common voltage applying line 131. The first contact hole 186-1 penetrates the passivation layers 180 and 185, and the second contact hole 186-2 penetrates the passivation layers 180 and 185 and the gate insulating layer 140.

Figure 7:
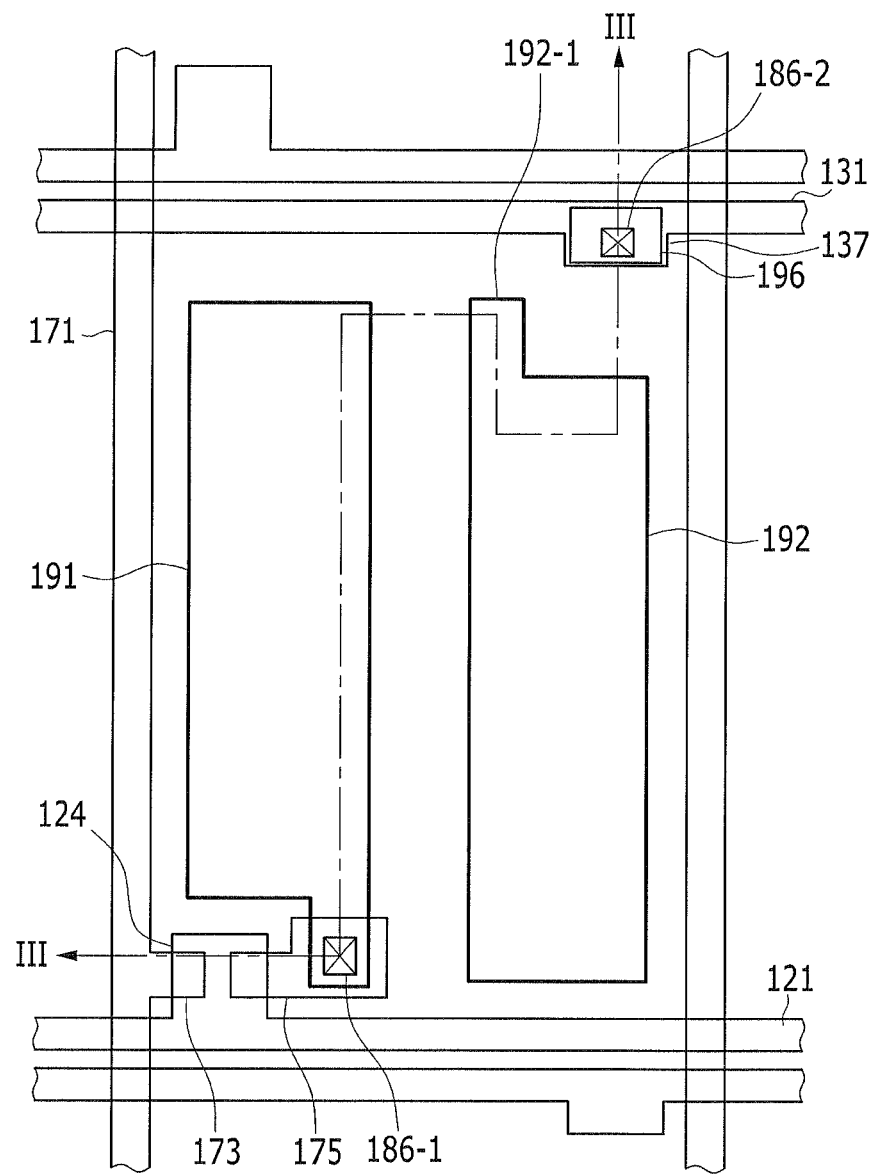
Figure 8:
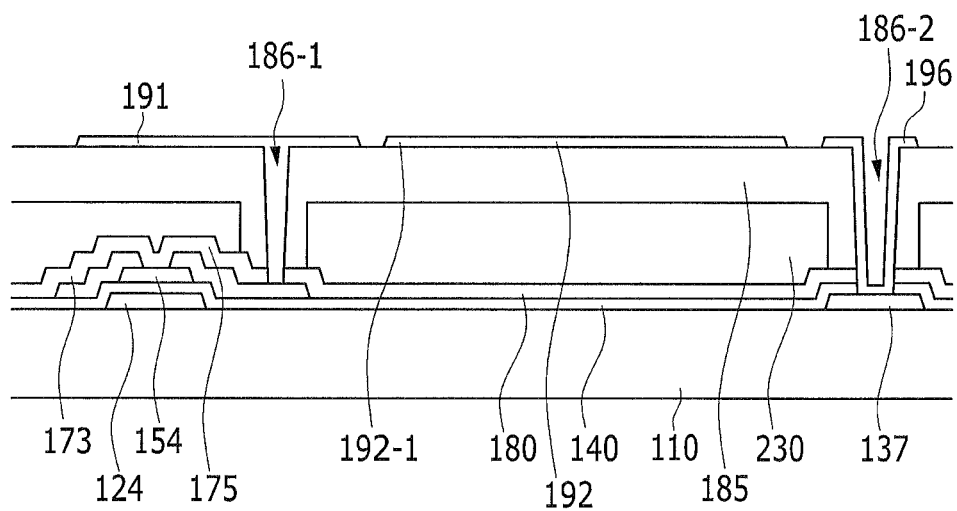

As shown in FIGS. 7 and 8, a pixel electrode 191 and a second floating electrode 192 are formed on the second passivation layer 185. In this case, the pixel electrode 191 and the second floating electrode 192 may include a transparent conductive material, such as ITO and/or IZO.

The pixel electrode 191 and the second floating electrode 192 are positioned in a pixel region defined by the gate line 121, the data line 171, and the common voltage applying line 131. The pixel electrode 191 and the second floating electrode 192 are separately positioned within the pixel region. The pixel electrode 191 and the second floating electrode 192 are horizontally adjacent to each other. Further, an area of the pixel electrode 191 may be substantially the same as an area of the second floating electrode 192. According to an exemplary embodiment, the pixel electrode 191 and the second floating electrode 192 may have different areas.

A protrusion of the pixel electrode 191 protrudes towards the first contact hole 186-1. The protrusion is physically and electrically connected to the drain electrode 175 through the first contact hole 186-1. The pixel electrode 191 receives a data voltage from the drain electrode 175 through the protrusion. The second floating electrode 192 includes an exposed portion 192-1 protruding upwardly.

Figure 9:
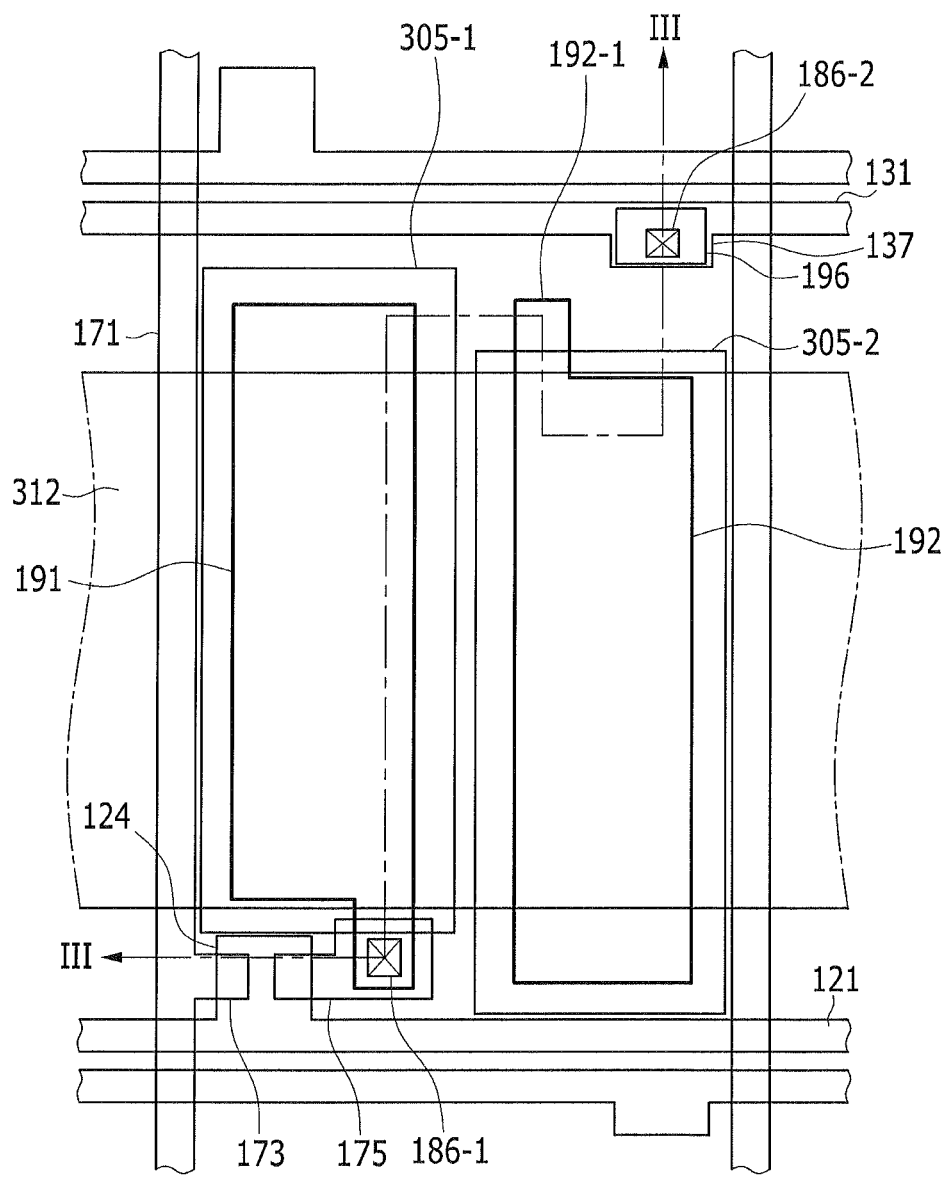
Figure 10:
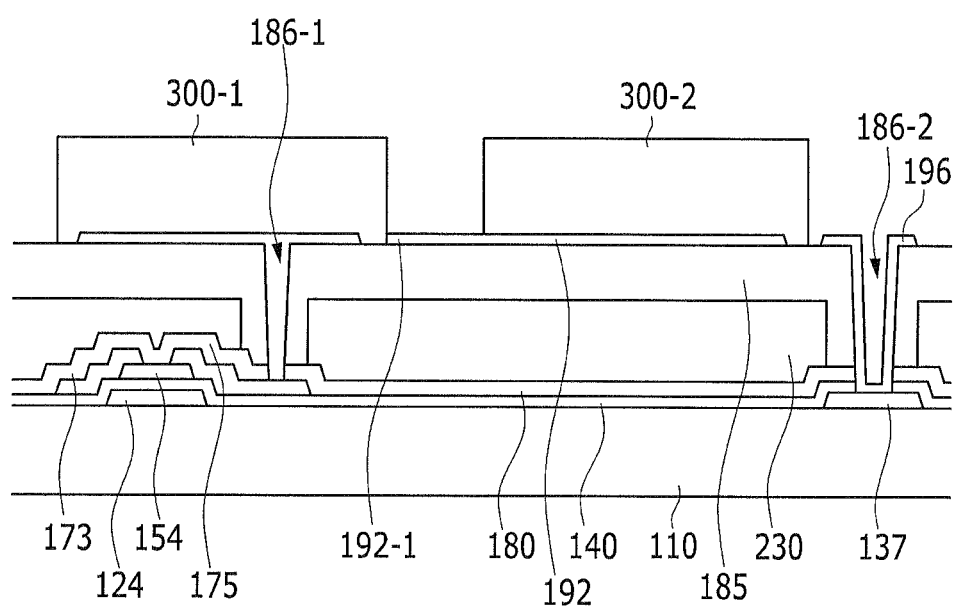

As shown in FIGS. 9 and 10, a first sacrificial layer 300-1 is formed on the pixel electrode 191, and a second sacrificial layer 300-2 is formed on the second floating electrode 192. The first sacrificial layer 300-1 and the second sacrificial layer 300-2 are separated from each other at a predetermined interval, and the exposed portion 192-1 of the second floating electrode 192 is formed between the first and the second sacrificial layers 300-1 and 300-2. The first sacrificial layer 300-1 and the second sacrificial layer 300-2 may include a photoresist.

The sacrificial layers 300-1 and 300-2 have a side surface, an upper surface, and a lower surface. The side surface includes a vertical surface. The present invention is not limited thereto, but the side surface may include tapered or inversely tapered surface. The upper surface and the lower surface may be horizontal.

Hereinafter, subsequent processes according to an exemplary embodiment will be described with reference to FIGS. 2, 9 and 10.

A first floating electrode 271 is formed on the upper surface of the first sacrificial layer 300-1, and the common electrode 272 is formed on the upper surface of the second sacrificial layer 300-2.

The first floating electrode 271 has the connection portion 271-1 extended along the side surface of the first sacrificial layer 300-1. The connection portion 271-1 is formed to be in contact with the exposed portion 192-1 of the second floating electrode 192.

The common electrode 272 is formed to fill the second contact hole 186-2, and the common electrode 272 is electrically connected to the protrusion 137 of the common voltage applying line 131 through the second contact hole 186-2.

The first floating electrode 271 and the common electrode 272 may include a transparent conductive material, such as ITO and/or IZO.

Then, the lower insulating layer 311 for covering the first floating electrode 171, the common electrode 272, the second passivation layer 185, and the sacrificial layers 300-1 and 300-2 is formed on the first floating electrode 171, the common electrode 272, and the second passivation layer 185, and the side surfaces of the sacrificial layers 300-1 and 300-2. The lower insulating layer 311 may include an inorganic insulating material, such as silicon nitride (SiNx).

Then, a roof layer 312 is formed on an upper surface of the lower insulating layer 311. The roof layer 312 may include an organic insulating material.

Then, an upper insulating layer 313 is formed on the lower insulating layer 311 and the roof layer 312. The upper insulating layer 313 may include an inorganic insulating material, such as silicon nitride (SiNx).

Next, the liquid crystal injection hole 307 is completed by removing the upper insulating layer 313 and the lower insulating layer 311 positioned in a region in which the roof layer 312 is not formed. In an exemplary embodiment, the first floating electrode 271 or the common electrode 272 may be further etched.

Each of the first sacrificial layer 300-1 and the second sacrificial layer 300-2 is exposed through the liquid crystal injection hole 307 formed as described above.

The first sacrificial layer 300-1 and the second sacrificial layer 300-2 are removed through the exposed portion. When the sacrificial layers 300-1 and 300-2 include a photoresist (PR), the sacrificial layers 300-1 and 300-2 may be removed by immersing the sacrificial layers 300-1 and 300-2 in an etchant to remove the photoresist. For example, the etchant may include a photoresist stripper.

In an exemplary embodiment, when a photoresist pattern remains after the liquid crystal injection hole 307 is formed on the upper insulating layer 313, the photoresist pattern may be simultaneously removed when the sacrificial layers 300-1 and 300-2 are removed to reduce a manufacturing step.

The regions in which the sacrificial layers 300-1 and 300-2 are removed become the microcavities 305-1 and 305-2.

In an exemplary embodiment, alignment layers (not shown) may be formed on the first floating electrode 271 and the common electrode CE defining the microcavities 305-1 and 305-2. Liquid crystal molecules 310 are injected in the first and second microcavities 305-1 and 305-2 by using capillary force, respectively.

Then, a capping layer (not shown) may be formed to seal the microcavities 305-1 and 305-2 and may prevent the liquid crystal layers 3 injected in the microcavities 305-1 and 305-2 from being leaked to the outside.

According to an exemplary embodiment, the lower insulating layer 311 and the upper insulating layer 313 may be omitted.

Then, a process of attaching the polarization plate (not illustrated) under the insulation substrate 110 and above the upper insulating layer 313 may be further performed. The polarization plate may include a polarization element for generating polarized light and a tri-acetyl-cellulose (TAC) layer for securing durability, and according to an exemplary embodiment, directions of transmission axes of an upper polarization plate and a lower polarization plate may be vertical or parallel.

According to an exemplary embodiment of the present invention, a pixel may include two microcavities, and the two microcavities may include a serially-connected two liquid crystal capacitors. Each of two liquid crystal capacitors may be formed in a corresponding microcavity. When one microcavity of the two microcavities is collapsed, it is possible to display an image through the other liquid crystal capacitor.

Hereinafter, an exemplary embodiment of driving a pixel will be described with reference to FIGS. 11(A) and 11(B). A common voltage applied to a common voltage applying line Com may have a voltage having opposite polarity. For example, a common voltage may swing between −5 V and +5 V for a predetermined period.

In FIG. 11(A), the common voltage of −5 V is applied to the common electrode CE through a common voltage applying line Com. A data voltage of 5 V is applied to a pixel electrode PE of a first liquid crystal capacitor EM1 through the data line Data and a switching element TFT. Accordingly, first and second floating electrodes FE1 and FE2 have an intermediate value (e.g., 0 V) of the common voltage and the data voltage when the first crystal capacitor EM1 and the second crystal capacitor EM2 have a substantially same capacitance.

In FIG. 11B, the common voltage is 5 V, opposite polarity of the common voltage of FIG. 11A, and data voltage is −5 V. As described above, the voltage applied to the first floating electrode and the second floating electrodes have an intermediate value (e.g., 0 V) of the common voltage and the data voltage when the first crystal capacitor EM1 and the second crystal capacitor EM2 have a substantially same capacitance.

In an exemplary embodiment, a common voltage may be fixed to 0 V. In this case, a data voltage needs to swing between +10 V and −10V to drive a pixel as FIGS. 11(A) and (B). Accordingly, the data voltage has a voltage difference of 20 V. In contrast, when the common voltage has ±5 V as shown in FIGS. 11(A) and 11(B), the data voltage has a voltage difference of 10 V.

Figure 11:
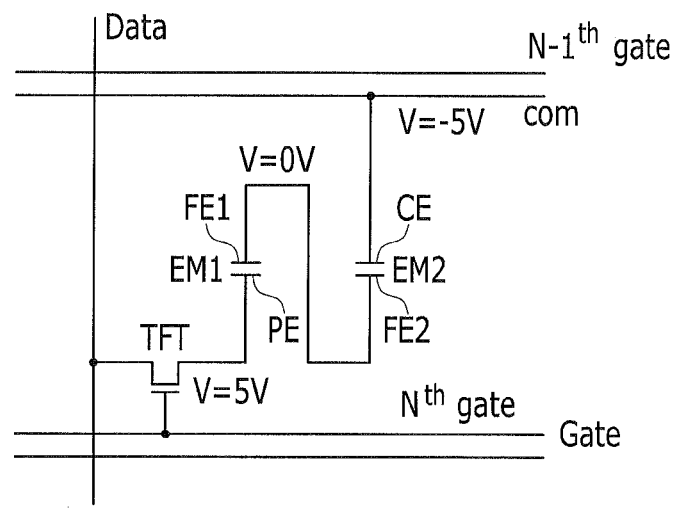
FIGS. 11(A) and 11(B) show an exemplary embodiment of driving a pixel according to an exemplary embodiment of the present invention.
Figure 11:
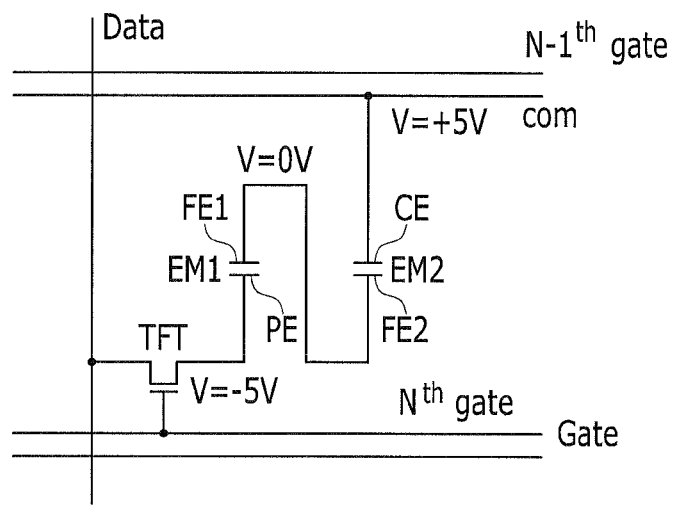

A pixel structure of the liquid crystal display of FIG. 11 is substantially the same as that of FIG. 1. The common voltage in an exemplary embodiment of FIG. 1 is fixed to 0 V or the predetermined voltage value, but the common voltage in the exemplary embodiment of FIG. 11 swings for a predetermined period.

Accordingly, the voltage swing method in applying a common voltage decrease a driving voltage, thereby decreasing power consumption.

Hereinafter, an exemplary embodiment of the present invention will be described with reference to FIGS. 12 to 14.

Figure 12:
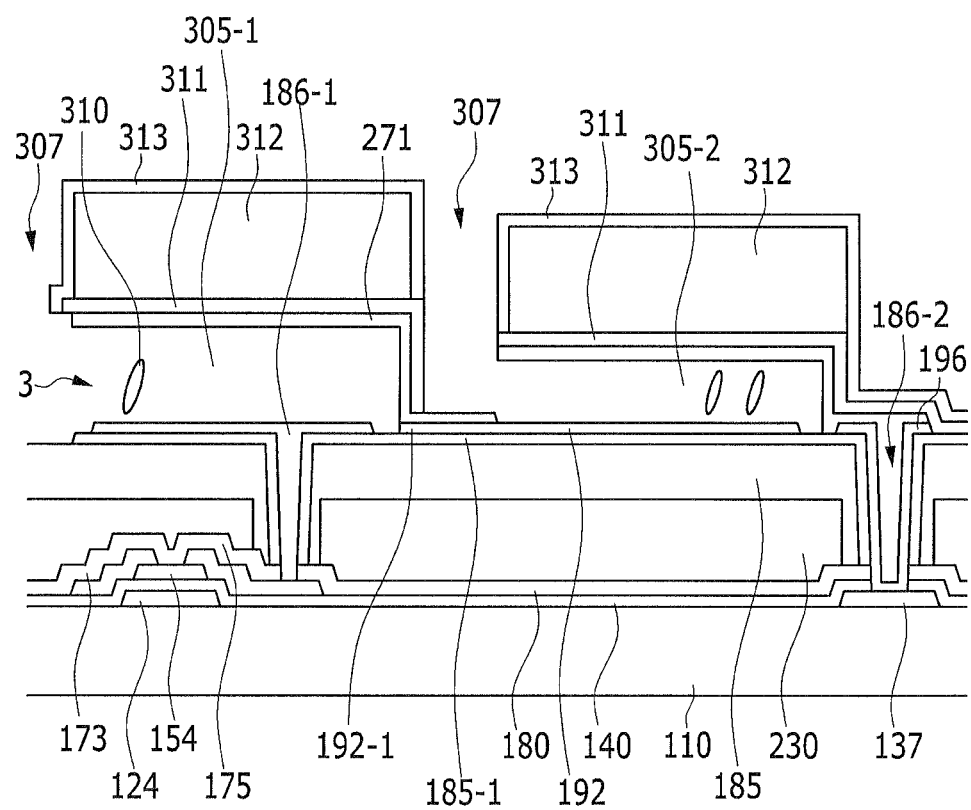
FIGS. 12 to 14 are views illustrating a liquid crystal display according to an exemplary embodiment of the present invention.
Figure 13:
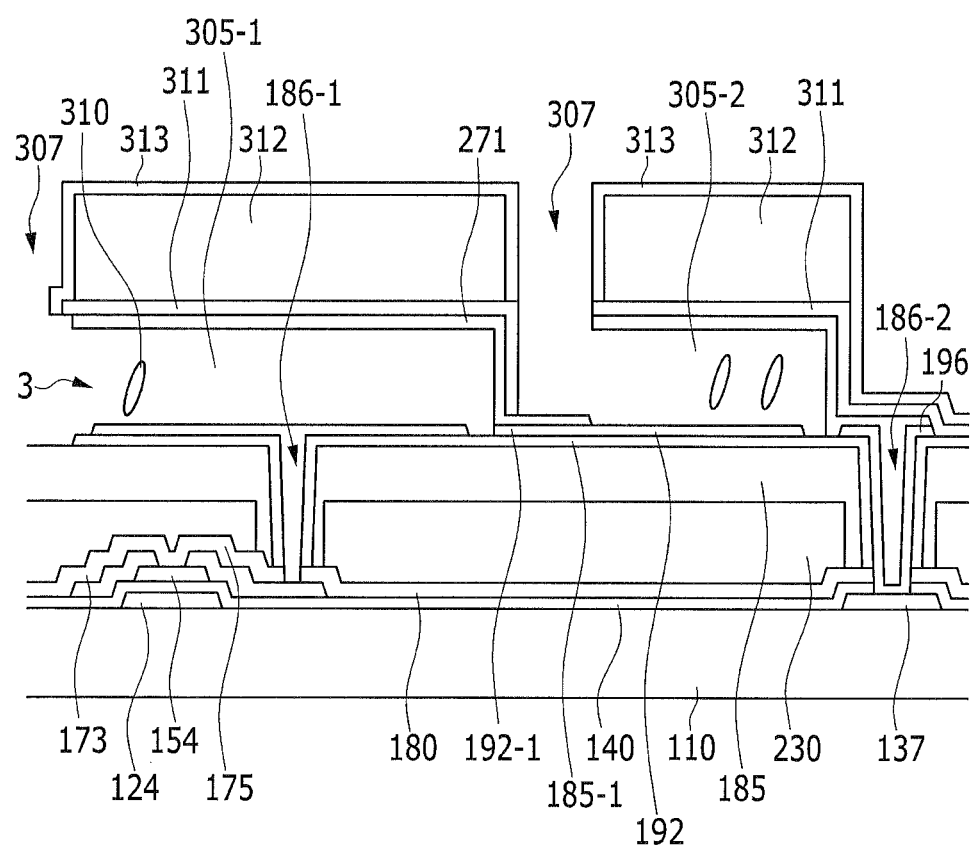
Figure 14:
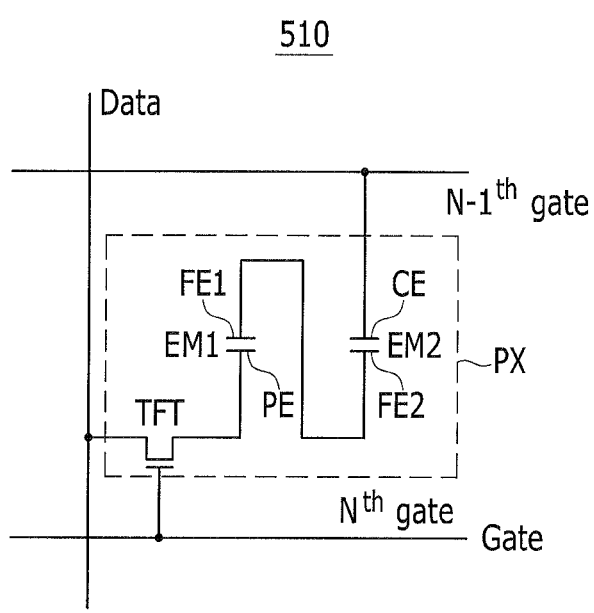

FIGS. 12 to 14 are views illustrating a liquid crystal display according to an exemplary embodiment of the present invention. In the liquid crystal display, two liquid crystal capacitors have different capacitance values, and thus the liquid crystal display has an increased degree of side visibility.

FIGS. 12 and 13 show a liquid crystal display which is substantially the same as that of FIG. 3, except that a first liquid crystal capacitor has a capacitance value different from that of a second liquid capacitor.

As shown in FIG. 12, a first microcavity 305-1 has a different height than that of a second microcavity 305-2. For example, the first crystal capacitor having a liquid crystal layer 3 formed in the first microcavity 305-1 has a first distance between two electrodes, e.g., a pixel electrode 191 and a first floating electrode 271. The pixel electrode 191 has a first area which is vertically spaced apart from a portion of the first floating electrode 271 at a first distance. The second crystal capacitor having a liquid crystal layer 3 formed in the second microcavity 305-2 has a second distance between two electrodes, e.g., a second floating electrode 192 and a common electrode 272. The common electrode 192 has a second area which is vertically spaced apart from a portion of the second floating electrode 272 at a second distance. The first distance is greater than the second distance, and thus the capacitance of the second liquid crystal capacitor is greater than the capacitance of the first liquid crystal capacitor. Accordingly, the capacitance of the second liquid crystal capacitor is different from the capacitance of the first liquid crystal capacitor.

As shown in FIG. 12, capacitance of the first liquid crystal capacitor is smaller than that of the second liquid crystal capacitor, and a voltage held at both terminals of the first liquid crystal capacitor is greater than a voltage held at both terminals of the second liquid crystal capacitor. According to a ratio of the capacitance of the first liquid crystal capacitor to the capacitance of the second liquid crystal capacitor, the first floating electrode and the second floating electrode may have different voltages. As a result, voltages applied to the liquid crystal layer 3 of the respective liquid crystal capacitors are different. Since the alignment directions of the liquid crystal molecules 310 are different from each other, difference in luminance according to a viewing angle is reduced, thereby increasing side visibility.

According to an exemplary embodiment, two liquid crystal capacitors have different capacitance by differentiating areas occupied by the two liquid crystal capacitors. As shown in FIG. 13, a first liquid crystal capacitor having a liquid crystal layer 3 formed in a first microcavity 305-1 has greater area than that of a second liquid crystal capacitor having a liquid crystal layer 3 formed in a second microcavity 305-2. For example, a pixel electrode and a first floating electrode 191 and 271 have greater area than that of a second floating electrode and a common electrode 192 and 272. As a result, the first liquid crystal capacitor has a greater capacitance area than that of the second liquid crystal capacitor. Accordingly, the first liquid crystal capacitor has a greater capacitance than that of the second liquid crystal capacitor.

As shown in FIG. 13, when the capacitance of the first liquid crystal capacitor is greater than the capacitance of the second liquid crystal capacitor, a voltage held between terminals of the first liquid crystal capacitor is smaller than a voltage held between terminals of the second liquid crystal capacitor. According to a ratio of the capacitance of the first liquid crystal capacitor to the capacitance of the second liquid crystal capacitor, the first floating electrode and the second floating electrode have different voltages. As a result, the voltages applied to the liquid crystal layer 3 of the respective liquid crystal capacitors are different. Since the alignment directions of the liquid crystal molecules are different from each other, difference in luminance according to a viewing angle is reduced, thereby increasing side visibility.

Further, a third passivation layer 185-1 is formed on a second passivation layer 185. The third passivation layer 185-1 may include an inorganic insulation material such as silicon nitride (SiNx). In an embodiment, the third passivation layer 185-1 may be omitted. The third passivation layer 185-1, formed on the second passivation layer 185, is positioned under the pixel electrode 191 and the second floating electrode 192. Further, the third passivation layer 185-1 is conformally formed on sidewall of the contact holes 186-1 and 186-2.

In FIG. 14, a liquid crystal display 510 is substantially similar to that of FIG. 1, except that the liquid crystal display 510 does not include a common voltage applying line Com of FIG. 1. Accordingly, a common electrode CE of a second liquid crystal capacitor EM2 is connected to a front gate line N–1$^{th}$ gate of another pixel (not shown) adjacent to the pixel PX. A gate off voltage is constantly applied to gate lines N$^{th}$ gate and N–1$^{th}$ gate except for a short period for which a gate on voltage is applied. Accordingly, the second liquid crystal capacitor EM2 receives a constant voltage through another gate line when the pixel PX operates.

According to an exemplary embodiment, a pixel may include two subpixels including a first and a second subpixels. For example, the first subpixel includes a first liquid crystal capacitor, and the second subpixel includes a second subpixel.

While the present invention has been shown and described with reference to exemplary embodiments thereof, it will be apparent to those of ordinary skill in the art that various changes in form and detail may be made therein without departing from the spirit and scope of the present invention as defined by the following claims.

What is claimed is:

1. A liquid crystal display comprising:
   a gate line formed on an insulation substrate;
   a data line insulated from the gate line and crossing the gate line; and
   a first pixel connected to the gate line and the data line, wherein the pixel comprises:
   a thin film transistor comprising a control terminal connected to the gate line and an input terminal connected to the data line;
   a first liquid crystal capacitor having one end connected to an output terminal of the thin film transistor; and
   a second liquid crystal capacitor having one end connected to the other end of the first liquid crystal capacitor,
   wherein the first liquid crystal capacitor includes a first liquid crystal layer formed in a first microcavity and the second liquid crystal capacitor includes a second liquid crystal layer formed in a second microcavity.

2. The liquid crystal display of claim 1, wherein the other end of the second liquid crystal capacitor receives a common voltage.

3. The liquid crystal display of claim 2, wherein the common voltage is maintained with a predetermined voltage value, or is changed between two voltage values having opposite polarity for a predetermined period.

4. The liquid crystal display of claim 2, wherein the other end of the second liquid crystal capacitor is connected to a common voltage applying line.

5. The liquid crystal display of claim 2, further comprising:
   a second pixel having a gate line, wherein the gate line of the second pixel is connected to the other end of the second liquid crystal capacitor.

6. The liquid crystal display of claim 2, wherein the first liquid crystal capacitor further comprises a pixel electrode and a first floating electrode, wherein the pixel electrode and the first floating electrode defines the first microcavity, and the second liquid crystal capacitor further includes a second floating electrode and a common electrode, wherein the second floating electrode and the common electrode defines the second microcavity.

7. The liquid crystal display of claim 6, wherein the pixel electrode having a first area is vertically spaced apart from a portion of the first floating electrode at a first distance, and the common electrode having a second area is vertically spaced apart from a portion of the second floating electrode at a second distance.

8. The liquid crystal display of claim 7, wherein the first distance is a substantially equal to the second distance.

9. The liquid crystal display of claim 6, wherein the first area is a substantially equal to the second area.

10. A liquid crystal display comprising:
    a gate line formed on an insulation substrate;
    a data line insulated from the gate line and crossing the gate line;
    a thin film transistor comprising a control terminal connected to the gate line and an input terminal connected to the data line;
    a pixel electrode having a first area and connected to an output terminal of the thin film transistor;
    a common electrode having a second area and receiving a common voltage; and
    a floating electrode including a first floating electrode of which a portion faces the pixel electrode and a second floating electrode of which a portion faces the common electrode.

11. The liquid crystal display of claim 10, further comprising:
    a first liquid crystal layer positioned between the pixel electrode and the first floating electrode, wherein the pixel electrode is vertically spaced apart from the portion of the first floating electrode at a first distance; and
    a second liquid crystal layer positioned between the second floating electrode and the common electrode, wherein the common electrode is vertically spaced apart from the portion of the second floating electrode at a second distance,
    wherein the first liquid crystal layer and the second liquid crystal layer are formed in a first microcavity and a second microcavity, respectively.

12. The liquid crystal display of claim 11, wherein the first microcavity and the second microcavity are horizontally spaced apart from each other.

13. The liquid crystal display of claim 12, wherein the first distance is substantially equal to the second distance.

14. The liquid crystal display of claim 12, wherein the first area is substantially equal to the second area.

15. The liquid crystal display of claim 10, wherein the first floating electrode is connected to the second floating electrode.

16. A method of manufacturing a liquid crystal display comprising:
    forming a pixel electrode having a first area and a second floating electrode on an insulation substrate;
    forming a first sacrificial layer having a first thickness on the pixel electrode, and a second sacrificial layer having a second thickness on the second floating electrode;

forming a first floating electrode connected to the second floating electrode on the first sacrificial layer, and a common electrode having a second area on the second sacrificial layer;

forming a roof layer on the first floating electrode and the common electrode;

forming a liquid crystal injection hole to expose a side surface of the first and the second sacrificial layer;

forming a first microcavity and a second microcavity by removing the first sacrificial layer and the second sacrificial layer through the liquid crystal injection hole; and injecting liquid crystal molecules in the first microcavity and the second microcavity through the liquid crystal injection hole.

17. The method of claim 16, further comprising:
forming a common voltage applying line, wherein the common voltage applying line is connected to the common electrode.

18. The method of claim 16, wherein the pixel electrode and the second floating electrode include a substantially same material.

19. The method of claim 16, wherein the first thickness is substantially equal to the second thickness.

20. The method of claim 16, wherein the first area is substantially equal to the second area.

* * * * *